(12) United States Patent
Harmon et al.

(10) Patent No.: US 11,932,077 B2
(45) Date of Patent: Mar. 19, 2024

(54) CLIMATE CONTROLLED FRONT TRUNK

(71) Applicant: Ford Global Technologies, LLC, Dearborn, MI (US)

(72) Inventors: Michael John Harmon, Northville, MI (US); Benjamin Howard, Grosse Pointe Park, MI (US); Kathryn N. Cezar, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/949,328

(22) Filed: Sep. 21, 2022

(65) Prior Publication Data

US 2023/0391159 A1 Dec. 7, 2023

Related U.S. Application Data

(60) Provisional application No. 63/347,704, filed on Jun. 1, 2022.

(51) Int. Cl.
*B60H 1/00* (2006.01)
*B60R 5/02* (2006.01)

(52) U.S. Cl.
CPC ..... *B60H 1/00264* (2013.01); *B60H 1/00207* (2013.01); *B60R 5/02* (2013.01); *B60H 2001/00214* (2013.01)

(58) Field of Classification Search
CPC ............ B60H 1/00021; B60H 1/00207; B60H 1/00264; B60H 1/00392; B60H 2001/00214; B60R 5/02; F25D 23/06; F25D 23/062; F25D 23/069; F25D 2323/061

See application file for complete search history.

(56) References Cited

U.S. PATENT DOCUMENTS

| | | | |
|---|---|---|---|
| 3,850,006 A | 11/1974 | Redfern et al. | |
| 4,759,190 A | 7/1988 | Trachtenberg et al. | |
| 4,765,151 A | 8/1988 | Bessey | |
| 5,839,293 A | 11/1998 | Teitelbaum et al. | |
| 6,182,465 B1 * | 2/2001 | Ricci | B65D 81/3848 |
| | | | 62/457.1 |
| 6,997,004 B1 | 2/2006 | Pittman | |
| 10,953,721 B2 | 3/2021 | Gruber | |
| 11,214,185 B2 * | 1/2022 | Qiu | B60K 1/04 |

(Continued)

FOREIGN PATENT DOCUMENTS

DE 102012204160 A1 9/2013
DE 102020106560 A1 9/2021

(Continued)

OTHER PUBLICATIONS

Machine translation of JP2003112786 (Year: 2003).*

(Continued)

*Primary Examiner* — Joseph F Trpisovsky
(74) *Attorney, Agent, or Firm* — Vichit Chea; Carlson, Gaskey & Olds, P.C.

(57) ABSTRACT

This disclosure relates to a climate controlled front trunk. In some aspects, the techniques described herein relate to a motor vehicle, including: a climate control system; and a front trunk establishing a cargo space, wherein the front trunk is configured to receive thermally conditioned air from the climate control system.

11 Claims, 7 Drawing Sheets

(56) References Cited

U.S. PATENT DOCUMENTS

| | | | |
|---|---|---|---|
| 2010/0100266 A1 | 4/2010 | Yoshinori et al. | |
| 2014/0061201 A1* | 3/2014 | Hernandez | F25D 25/025 29/428 |
| 2016/0257181 A1 | 9/2016 | Zhou et al. | |
| 2018/0251008 A1 | 9/2018 | Androulakis et al. | |
| 2020/0108688 A1* | 4/2020 | Gruber | H01M 10/656 |
| 2020/0109889 A1* | 4/2020 | Kieling | B65D 81/38 |
| 2020/0139894 A1* | 5/2020 | Glickman | B60R 5/02 |

FOREIGN PATENT DOCUMENTS

| | | | | |
|---|---|---|---|---|
| FR | 2897028 A1 * | 8/2007 | | B60N 3/104 |
| JP | 2003112786 A * | 4/2003 | | |
| JP | 2005094928 A | 4/2005 | | |

OTHER PUBLICATIONS

Machine translation of FR2897028 (Year: 2007).*
Jlucero. (Nov. 29, 2021). Which is better for groceries (milk)? frunk or trunk. Tesla Motors Club. Retrieved Aug. 18, 2022, from https://teslamotorsclub.com/tmc/threads/which-is-better-for-groceries-milk-frunk-or-trunk.53115/.
Teslarati. (Sep. 11, 2016). Tesla Model S front trunk (Frunk) Electric Cooler Review. Teslarati. Retrieved Aug. 18, 2022, from https://www.teslarati.com/tesla-model-s-front-trunk-frunk-cooler/.
R/teslamotors—is the frunk air conditioned? reddit. (n.d.). Retrieved Aug. 18, 2022, from https://www.reddit.com/r/teslamotors/comments/3nb3vi/is_the_frunk_air_conditioned/.
Levin, T. (Jan. 6, 2022). Tour the coolest features of the New Electric Chevy Silverado, from ultra-fast charging to a front trunk. Business Insider. Retrieved Aug. 17, 2022, from https://www.businessinsider.com/electric-chevy-silverado-ev-features-charging-midgate-frunk-multiflex-tailgate-2022-1#chevy-also-envisions-accessories-for-the-frunk-like-slide-out-drawers-and-tool-boxes-20.

* cited by examiner

CLIMATE CONTROLLED FRONT TRUNK

RELATED APPLICATION(S)

This application claims the benefit of U.S. Provisional Application No. 63/347,704, filed Jun. 1, 2022, the entirety of which is herein incorporated by reference.

TECHNICAL FIELD

This disclosure relates to a climate controlled front trunk.

BACKGROUND

Electrified vehicles are being developed to either reduce or completely eliminate the reliance on internal combustion engines. With the onset of electrified vehicles, many existing components in the vehicle engine compartment may become unnecessary. The space made available by the removal of these components makes room for a front trunk, which is a storage compartment located near the front of the vehicle, and which is commonly referred to using the portmanteau "frunk."

SUMMARY

In some aspects, the techniques described herein relate to a motor vehicle, including: a climate control system; and a front trunk establishing a cargo space, wherein the front trunk is configured to receive thermally conditioned air from the climate control system.

In some aspects, the techniques described herein relate to a motor vehicle, further including: an insulated container arranged in the cargo space, wherein the front trunk and the insulated container are configured such that thermally conditioned air from the climate control system is directed into an interior of the insulated container.

In some aspects, the techniques described herein relate to a motor vehicle, wherein the insulated container is a soft-sided cooler.

In some aspects, the techniques described herein relate to a motor vehicle, wherein the soft-sided cooler exhibits a length substantially equal to a length of the cargo space.

In some aspects, the techniques described herein relate to a motor vehicle, wherein: when the soft-sided cooler is in an expanded condition, the soft-sided cooler exhibits a first height, and when the soft-sided cooler is in a reduced-height condition, the soft-sided cooler exhibits a second height less than the first height.

In some aspects, the techniques described herein relate to a motor vehicle, wherein the soft-sided cooler is configured to open and close via a zipper.

In some aspects, the techniques described herein relate to a motor vehicle, further including a divider assembly configured to divide the cargo space into a first section that is configured to directly receive thermally conditioned air from the climate control system and a second section that does not directly receive thermally conditioned air from the climate control system.

In some aspects, the techniques described herein relate to a motor vehicle, wherein a vent is configured to expel thermally conditioned air from the climate control system into the first section.

In some aspects, the techniques described herein relate to a motor vehicle, wherein the divider assembly includes: a first wall including a plurality of slots; a second wall including a plurality of slots aligned with slots of the first wall; and a divider wall arranged in a slot of the first wall and a slot of the second wall, wherein the first section is on a first side of the divider wall and the second section is on a second side of the divider wall opposite the first side.

In some aspects, the techniques described herein relate to a motor vehicle, wherein the first wall is adjacent a rear of the front trunk, and the second wall is either adjacent bottom of the front trunk or adjacent a front of the front trunk.

In some aspects, the techniques described herein relate to a motor vehicle, wherein the divider assembly further includes a lid including a plurality of sections configured to fold to vary an effective surface area of the lid.

In some aspects, the techniques described herein relate to a motor vehicle, wherein the lid is magnetically attachable to the first and second walls.

In some aspects, the techniques described herein relate to a method, including: directing thermally conditioned air from a climate control system of a motor vehicle into a cargo space established by a front trunk of the motor vehicle.

In some aspects, the techniques described herein relate to a method, further including: configuring a divider assembly to divide the cargo space into a first section that is configured to receive thermally conditioned air from the climate control system and a second section that does not receive thermally conditioned air from the climate control system.

In some aspects, the techniques described herein relate to a method, wherein the step of configuring the divider assembly includes arranging a divider wall into one of a plurality of slots in a first wall and one of a plurality of slots in a second wall.

In some aspects, the techniques described herein relate to a method, wherein the first wall is adjacent a rear of the front trunk, and the second wall is either adjacent bottom of the front trunk or adjacent a front of the front trunk.

In some aspects, the techniques described herein relate to a method, wherein the step of configuring the divider assembly includes folding a lid such that the lid exhibits a surface area configured to cover the first section.

In some aspects, the techniques described herein relate to a method, wherein the lid is magnetically attachable to the first and second walls.

In some aspects, the techniques described herein relate to a method, wherein the directing step includes expelling thermally conditioned air into the cargo space via a vent.

In some aspects, the techniques described herein relate to a method, wherein the directing step includes expelling thermally conditioned air into a soft-sided cooler arranged in the cargo space.

BRIEF DESCRIPTION OF THE DRAWINGS

In FIG. 3, the soft-sided cooler is in an expanded condition.

DETAILED DESCRIPTION

This disclosure relates to a climate controlled front trunk. Among other benefits, which will be appreciated from the below description, the disclosed front trunk is particularly suited for transportation and storage of items while maintaining those items at hot or cold temperatures, as desired by a user, such as for transportation and storage of hot or cold food items.

Figure 1:
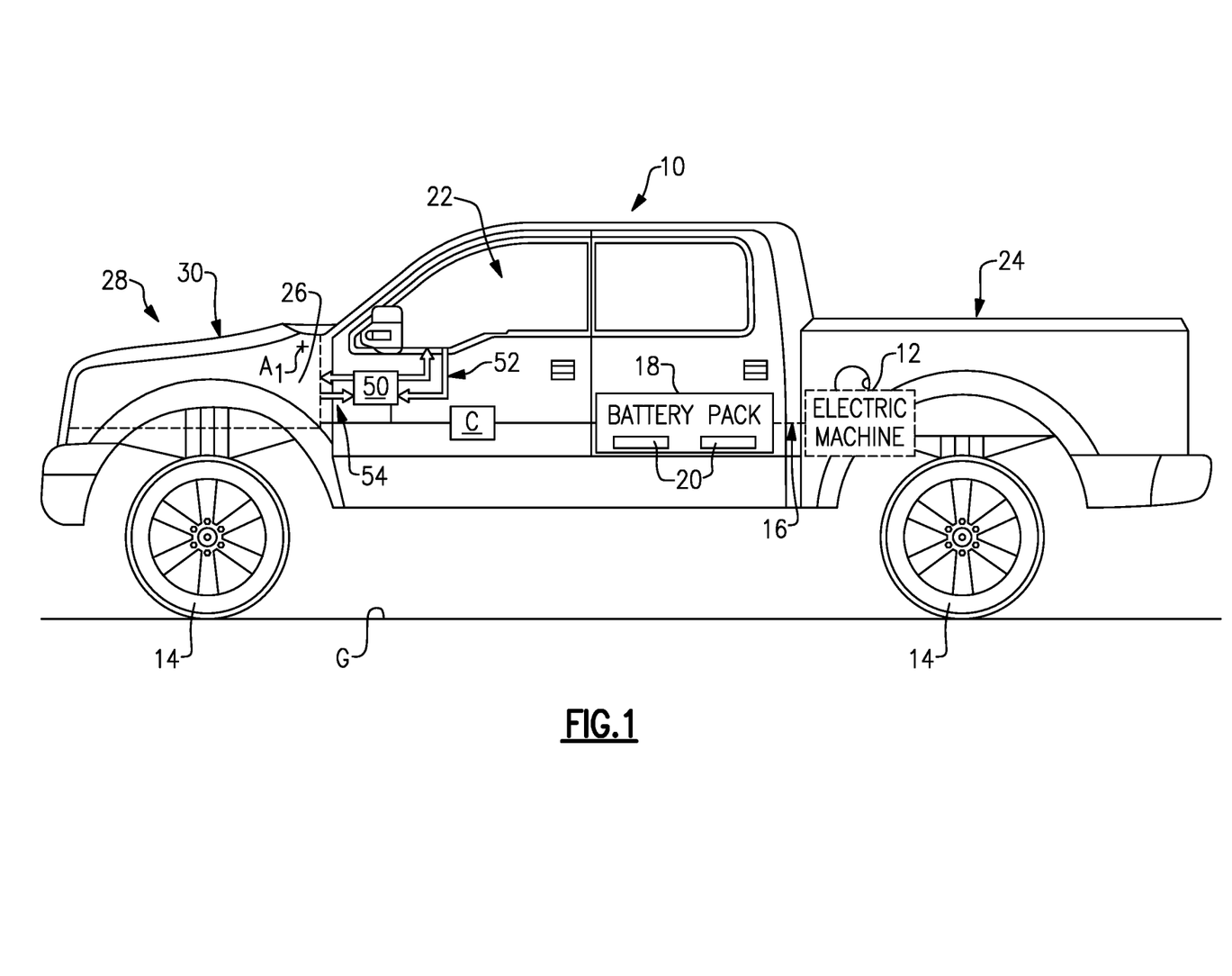
FIG. 1 schematically illustrates an electrified vehicle.

FIG. 1 schematically illustrates a motor vehicle, which here is an electrified vehicle 10 ("vehicle 10"). The vehicle 10 may include any type of electrified powertrain. In an embodiment, the vehicle 10 is a battery electric vehicle (BEV). However, the concepts described herein are not limited to BEVs and could extend to other electrified vehicles, including, but not limited to, plug-in hybrid electric vehicles (PHEVs), fuel cell vehicles, etc. Therefore, although not specifically shown in this embodiment, the vehicle 10 could be equipped with an internal combustion engine that can be employed either alone or in combination with other energy sources to propel the vehicle 10. In particular, certain aspects of this disclosure could apply to vehicles other than electrified vehicles that include front trunks, such as mid-engined or rear-engined vehicles.

In the illustrated embodiment, the vehicle 10 is a full electric vehicle propelled solely through electric power, such as by one or more electric machines 12, without any assistance from an internal combustion engine. The electric machine 12 may operate as an electric motor, an electric generator, or both. The electric machine 12 receives electrical power and provides a rotational output torque to one or more drive wheels 14, such as through a transmission gearbox (not shown).

A voltage bus 16 electrically connects the electric machine 12 to a battery pack 18. The battery pack 18 is an exemplary electrified vehicle battery. The battery pack 18 may be a high voltage traction battery pack that includes one or more battery arrays 20 (i.e., groupings of rechargeable battery cells) capable of outputting electrical power to operate the electric machine 12 and/or other electrical loads of the vehicle 10. Other types of energy storage devices and/or output devices can also be used to electrically power the vehicle 10.

In the illustrated embodiment, the vehicle 10 is a pickup truck. However, the vehicle 10 could also be a car, a van, a sport utility vehicle, or any other type of vehicle.

As shown in FIG. 1, the vehicle 10 includes a passenger cabin 22, a truck bed 24 located to the rear of the passenger cabin 22, and a front trunk 26 located to the front of the passenger cabin 22. The truck bed 24 may establish a first cargo space of the vehicle 10, and the front trunk 26 may establish a second cargo space of the vehicle 10. The front trunk 26 may be referred to using the portmanteau "frunk" or more generally as a front cargo space.

The front trunk 26 may provide an additional cargo space not traditionally available in most conventional internal combustion powered vehicles. This disclosure includes various features that increase the usefulness and usability of the front trunk 26.

The front trunk 26 is selectively covered by a closure assembly 28. In this example, the closure assembly 28 is provided by a panel 30 that provides the hood and grille of the vehicle 10. The panel 30 is rotatable about axis Ai adjacent a rear of the panel 30 between a closed position (FIG. 1) and an open position (FIG. 2) to selectively cover and uncover the front trunk 26.

Figure 2:
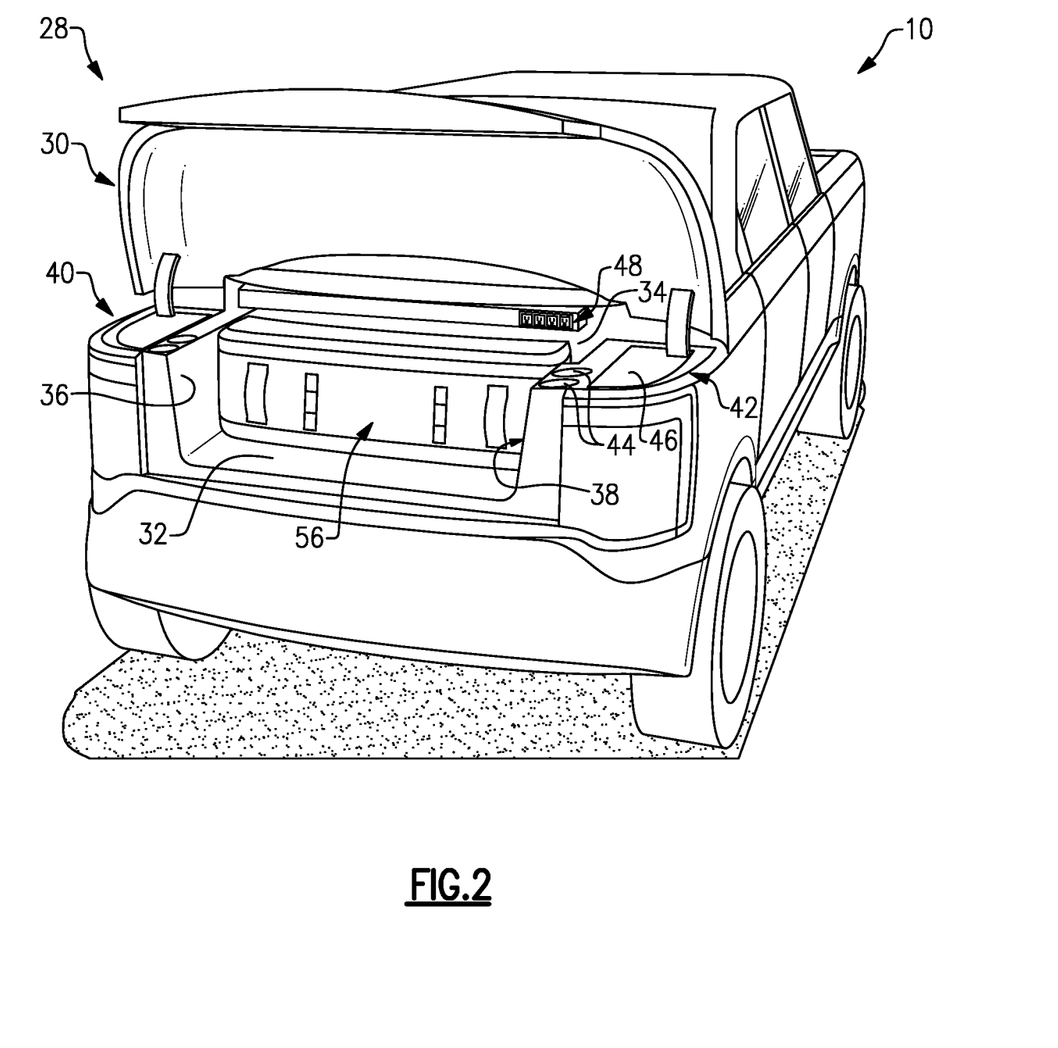
FIG. 2 illustrates a first aspect of this disclosure. In particular, in FIG. 2, a soft-sided cooler is arranged in the front trunk.

FIG. 2 illustrates the interior of the front trunk 26. The front trunk 26 includes a floor 32, a rear wall 34, and opposed lateral side walls 36, 38, which provide boundaries of a front cargo space of the vehicle 10. Various items can rest on the floor 32, and various other items can be attached to the rear wall 34 and the side walls 36, 38, in this example.

Laterally outward of the side walls 36, 38, side ledges 40, 42 are accessible and usable when the panel 30 is open. The side ledges 40, 42 extend laterally from an upper portion of a respective one of the side walls 36, 38 to an exterior side of the vehicle 10, and otherwise generally exhibit a similar contour to the panel 30 such that when the panel 30 is closed, the panel 30 overlaps and covers the side ledges 40, 42. In an example, the panel 30 directly abuts the side ledges 40, 42 when the panel 30 is closed. The side ledges 40, 42 are configured as useable spaces when the panel 30 is open. With reference to side ledge 42, the side ledge 42 includes two cup holders 44 and a work surface 46. The side ledge 40 is configured similarly, but reflected about the centerline of the vehicle 10. The side ledges 40, 42 are exemplary and could be configured differently. Further, the side ledges 40, 42 are not required in all examples.

The front trunk 26 may include various power outlets. In an example, four 120 Volt power outlets 48 are shown in the rear wall 34. While four 120 Volt power outlets are shown, there could include a different number or type of power outlets, including 240 Volt power outlets, USB-C outlets, etc. The front trunk 26 could include power outlets in additional locations.

The various surfaces of the front trunk 26 may be made of a polymeric material. However, other materials, including metallic materials, are also contemplated within the scope of this disclosure.

This disclosure relates to climate control for the front trunk 26. In particular, this disclosure includes embodiments in which thermally conditioned air is directed into certain sections of the front trunk 26. As such, those sections are particularly suited to handle storage and transportation of items, such as food or electronics, that would benefit from maintaining a particular temperature.

With reference back to FIG. 1, the vehicle 10 includes a refrigerant system 50, which is illustrated at a highly schematic level. The refrigerant system 50 may be referred to herein as a vehicle refrigerant system, and may be part of an overall climate control system configured meet the various thermal conditioning demands of the vehicle 10. In this example, the refrigerant system 50 includes a main loop 52. The main loop 52 is configured to thermally condition the passenger cabin 22. The main loop 52 includes at least a compressor, a condenser, an expansion device, and an evaporator. The main loop 52 is configured to direct fluid, namely air, within various passageways of the main loop 52. The main loop 52 includes a number of ducts, conduits, valves, etc., which are not shown in FIG. 2, that facilitate directing the thermally conditioned fluid to and from the passenger cabin 22.

The refrigerant system 50 also includes a front trunk loop 54 in this disclosure. The front trunk loop 54 is configured to thermally condition the front trunk 26, as will be discussed below. In particular, the front trunk loop 54 may include a number of ducts, conduits, valves, etc., that direct some of the thermally conditioned fluid from the main loop 52 to and from the front trunk 26. In this respect, the front trunk loop 54 may be considered a branch of the main loop 52, in which a portion of the thermally conditioned fluid within the main loop 52 is tapped and directed to the front trunk 26 via the front trunk loop 54. After thermally conditioning the front trunk 26, the fluid is then returned to the main loop 52. Alternatively, the front trunk loop 54 could be configured such that it includes its own dedicated compressor, condenser, expansion device, and evaporator. In that alternate example, fluid used to thermally condition the front trunk 26 would not intermix with fluid used to thermally condition the passenger cabin 22.

Further, the vehicle 10 includes a controller C (FIG. 1) that is part of an overall vehicle control module, such as a vehicle system controller (VSC), or could alternatively be a stand-alone controller separate from the VSC. The controller C may be programmed with executable instructions for interfacing with and operating the various components of the vehicle 10. The controller C additionally includes a processing unit and non-transitory memory for executing the various control strategies and modes of the vehicle 10. As examples, the controller C can selectively command the refrigerant system R to thermally condition either or both of the passenger cabin 22 or the front trunk 26, including directing heated or cooled air to either or both of the passenger cabin 22 or the front trunk 26. In this respect, the controller C is responsive to user commands, such as user settings, input via a user interface, such as human-machine interface (e.g., a touchscreen) within the passenger cabin 22.

Figure 3:
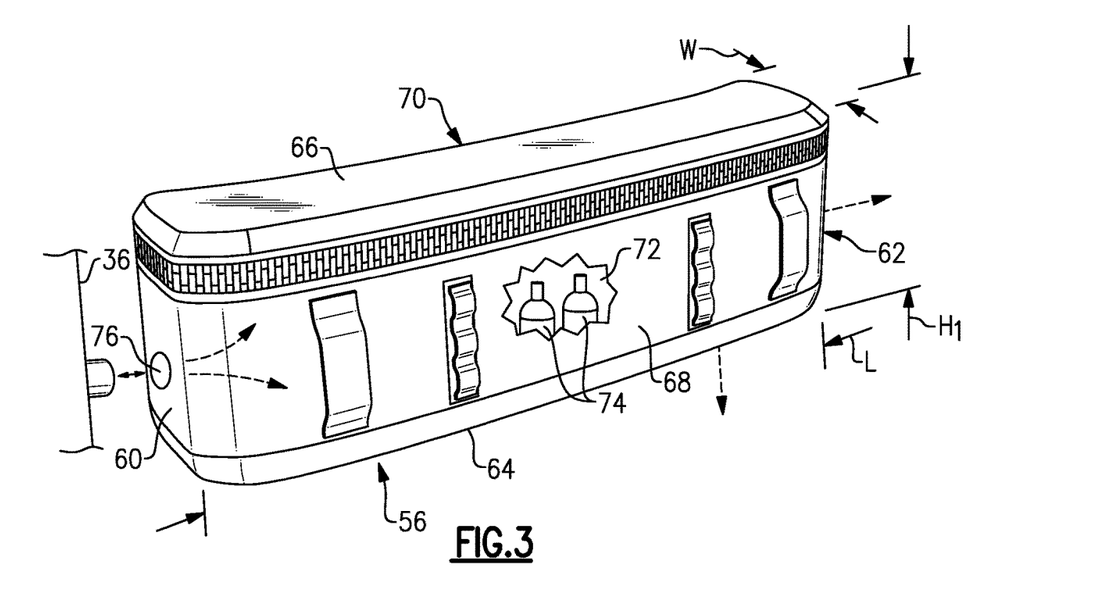
FIG. 3 illustrates additional detail of the soft-sided cooler relative to a portion of the front trunk.

In the embodiment of FIG. 2, an insulated container 56 is arranged in the cargo space of the front trunk 26. In this embodiment, the insulated container 56 is a soft-sided cooler. While a soft-sided cooler is mentioned, the insulated container 56 could be another type of insulated container such as a hard-sided cooler. The insulated container 56 is foldable to a reduced dimension, in particular a reduced height, in this example. With reference to FIG. 3, the insulated container 56 exhibits a length L between side walls 60, 62, a first height $H_1$ in an expanded condition between a base 64 and a top 66, and a width W between a front wall 68 and a rear wall 70. The length L in this example substantially equals, and is slightly less than, the distance between the side walls 36, 38. The first height $H_1$ substantially equals, and is slightly less than, a height of the cargo space of the front trunk 26, and in an example substantially equals the height of the side walls 36, 38.

The side walls 60, 62, base 64, top 66, front wall 68, and rear wall 70 are made of a relatively soft thermally insulating material. An interior 72 (visible through cutaway in front wall 68) of the insulated container 56 is accessible via a zipper 73 adjacent the top 66 and extending around the front wall 68, around the side walls 60, 62, and partially around of the rear wall 70. The front wall 68 includes accessories, such as loops configured for attaching items to the exterior of the insulated container 56, in this example.

Figure 4:
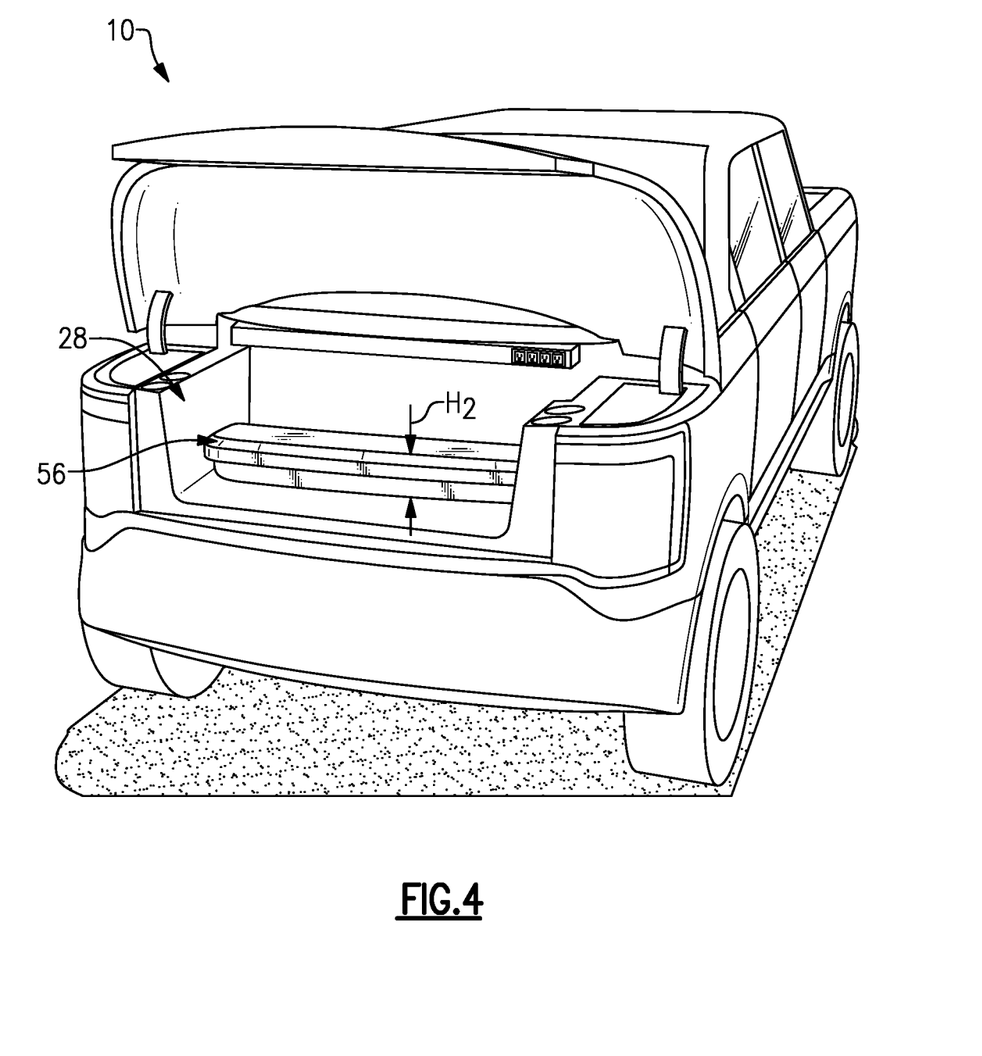
FIG. 4 is a view similar to FIG. 2 and illustrates the soft-sided cooler in a reduced-height condition.

Because the side walls 60, 62, front wall 68, and rear wall 70 are made of a relatively soft material, when the insulated container 56 is not in use, it can be folded to a reduced-height condition in which it exhibits a second height $H_2$ (FIG. 4) less than the first height $H_1$. In the reduced-height condition, the insulated container 56 takes up less space in the front trunk 26 relative to the expanded condition, which frees up space in the front trunk 26. In addition to folding the insulated container 56 to reduce its height, the insulated container 56 could be further folded along its length in some examples.

The insulated container 56 is configured to thermally insulate the interior 72 (visible through cutaway in front wall 68) of the insulated container 56 relative to an exterior of the insulated container 56, and namely the surrounding environment of the front trunk 26 and the vehicle 10. As shown through the cutaway, various items 74 can be stored in the insulated container 56. In FIG. 3, the items 74 are bottles containing a beverage that a user desires to keep cool. Other items that a user desires to keep cool or hot can be kept in the insulated container 56. In an example, batteries or tools can be kept cool in the insulated container 56. In another example, food, such as carryout food, can be kept warm in the insulated container 56.

The front trunk 26 and the insulated container 56 are configured such that thermally conditioned air from the refrigerant system 50 is directed into the interior 72. In this way, the items 74 are maintained at or close to a desired temperature. In one example, the insulated container 56 includes an inlet 76 configured to fluidly connect to an outlet 78 formed in the front trunk 26. In this example, the inlet 76 is formed in the side wall 60 and the outlet 78 is formed in the side wall 36. The inlet 76 may be a valve or port that can be selectively opened and closed. The inlet 76 may be a one-way valve configured to permit air to flow into the interior 72 but not out. The outlet 78 may be a conduit or section of a tube configured to fit relative to the inlet 76. In this example, the inlet 76 is a female fitting and the outlet 78 is a male fitting, although the inlet 76 could be configured as a male fitting and the outlet 78 could be configured as a female fitting. The inlet 76 and outlet 78 may be configured to couple together using a quick-connect or press-fit arrangement, as examples. In an example, when the insulated container 56 is in the front trunk 26, a user can arrange the insulated container 56 such that the outlet 78 is inserted into the inlet 76 such that thermally conditioned air expelled from the outlet 78 is directed into the interior 72. The outlet 78 is part of the front trunk loop 54. The air expelled from the outlet 78 is thermally conditioned and is configured to thermally condition items within the interior 72. In this example, all air flowing through the front trunk loop 54 flows through the interior 72.

The insulated container 56 includes an outlet, in this example. With respect to FIG. 2, the insulated container 56 may be configured to direct air out of the interior 72 and back to the front trunk loop 54, as represented by the dashed arrows flowing out the base 64 or side wall 62, as examples. The outlet could be a one-way valve configured to direct air out of the insulated container 56 but not in. When the outlet of the insulated container 56 is in the base 64, fluid is returned to the front trunk loop 54 via a conduit in the floor 32. When the outlet of the insulated container 56 is in the side wall 62, fluid is returned to the front trunk loop 54 via a conduit in the side wall 38. The outlet of the insulated container may be in another location, such as in the side wall 60 or the rear wall 70.

In an example, the insulated container 56 can be completely removed from the front trunk 26. When removed, the inlet 76 and outlet of the insulated container 56 are closed and the insulated container 56 can be used as a standard cooler. The front trunk 26 may include recesses or slots configured to provide a resting area for the insulated container 56 to resist sliding or movement of the insulated container 56 within the front trunk 26. Further, insulated container 56 could be attachable to or integrally formed with the front trunk 26. That is, the front trunk 26 could include a built-in insulated container.

Figure 5:
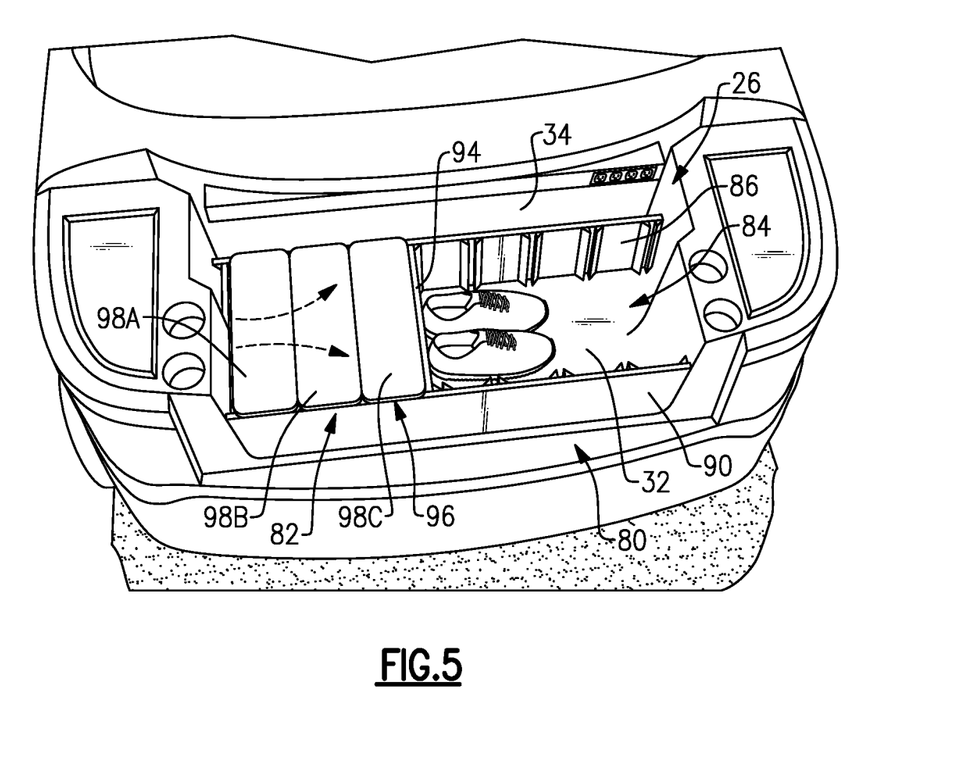
FIG. 5 illustrates a second aspect of this disclosure. In particular, in FIG. 5, a divider assembly is in the front trunk. Further, in FIG. 5, a lid is covering a section of the divider assembly.

Another aspect of this disclosure relates to a divider assembly 80, which is shown in FIG. 5. The divider assembly 80 is configured to divide the cargo space of the front trunk 26 into a first section 82 that is configured to directly receive thermally conditioned air from the climate control system and a second section 84 that does not directly receive thermally conditioned air.

Figure 6:
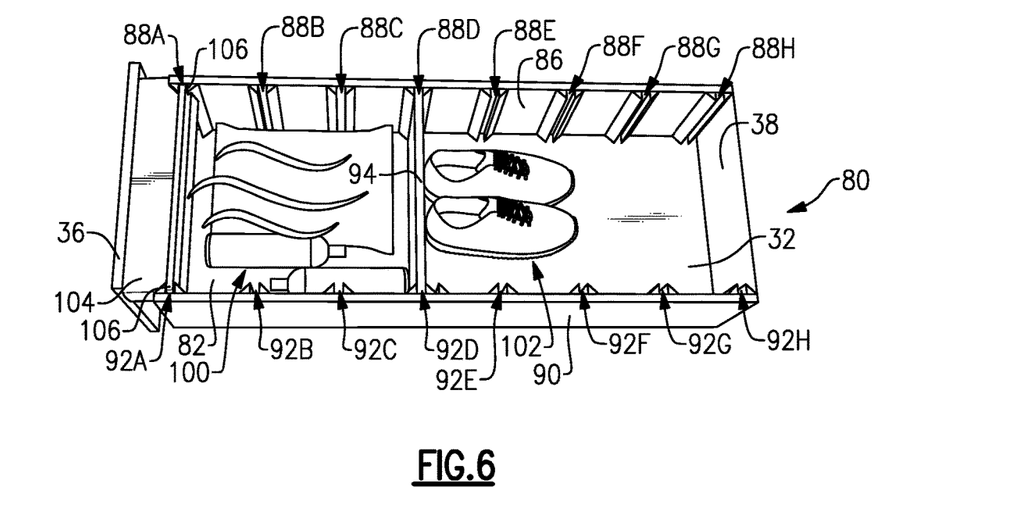
FIG. 6 illustrates additional detail of a divider assembly relative to a portion of the front trunk.

With joint reference to FIGS. 5 and 6, the divider assembly 80 includes a first wall 86 having a plurality of slots 88A-88H spaced-apart along the length of the wall 86, which in this example spans the entirety of the distance between side walls 36, 38. The slots 88A-88H are equally spaced-apart from one another in this example. The slots 88A-88H span an entirety of the height of the first wall 86, which is substantially equal to the height of the side walls 36, 38 in this example.

The divider assembly 80 also includes a second wall 90 which is sized and shaped substantially similar to the first wall 86. Specifically, the second wall 90 includes slots 92A-92H that are equally spaced-apart from one another along the length of the second wall 90 by the same distance as the slots 88A-88H. The slots 92A-92H also span an entirety of the height of the second wall 90.

The first and second walls 86, 90 are arranged in FIGS. 5 and 6 such that the first wall 86 is adjacent the rear wall 34 of the front trunk 26, and such that the second wall 90 is adjacent a front of the front trunk 26. Further, the first and second walls 86, 90 are arranged such that the slots 88A-88H face the slots 92A-92H, and such that the slots 88A-88H are laterally aligned, in a direction perpendicular to the centerline of the vehicle 10, with a corresponding one of the slots 92A-92H. For instance, slot 88A is laterally aligned with slot 92A, slot 88B is aligned with slot 92B, and so on.

With this arrangement, a divider wall 94 can be inserted from the top and into a corresponding pair of slots 88A-88H and 92A-92H. In this example, the divider wall 94 has been inserted into the slots 88D and 92D. The divider wall 94 separates the first and second sections 82, 84. Specifically, the first section 82 is bound by the side wall 36, the first wall 86, the second wall 90, and the divider wall 94. The second section 84 is bound by the divider wall 94, the first wall 86, the second wall 90, and the side wall 38. The first and second sections 82, 84 are also bound by the floor 32.

While a particular number of slots 88A-88H, 92A-92H are shown, this disclosure extends to walls with another number of slots. Further, while only one divider wall is shown, the divider assembly 80 could include additional divider walls. Alternatively, the divider wall 94 is not required, in which case substantially the entire front trunk 26 will be thermally conditioned.

Figure 7:
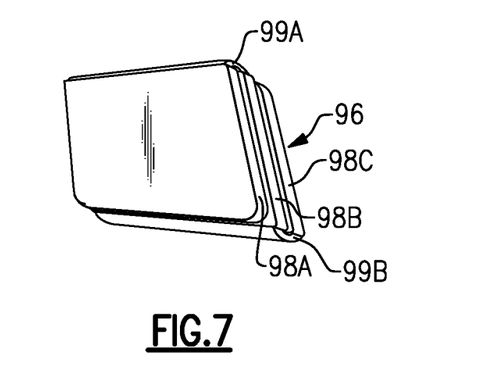
FIG. 7 illustrates an exemplary lid.

The first section 82 is also bound at a top by a lid 96 (FIG. 5), in this example. The lid 96 includes a plurality of sections 98A-98C in this example. The sections 98A-98C are foldable relative to one another between a folded position (FIG. 7) and an expanded position. The sections 98A-98C are connected by hinges 99A, 99B at alternating top and bottom edges of the sections 98A-98C, as shown in FIG. 7.

The size of the first section 82 is variable based on the location of the divider wall 94 to accommodate differently-sized items, for example. Depending on the location of the divider wall 94, the required lid size may vary. Thus, a user may selectively fold or unfold certain sections 98A-98C to vary the effective surface area of the lid 96. In a particular example, each of the sections 98A-98C exhibits a width corresponding to a distance between each of the slots 88A-88H, 92A-92H, such that each section 98A-98C will cover a gap between a pair of adjacent slots. Thus, a user can configure the lid 96 such that a certain amount of the sections 98A-98C are exposed and able to cover the first section 82, based on the configuration of the first section 82 and namely the position of the divider wall 94.

The lid 96 is selectively attachable to enclose the first section 82 from the top. In an example, the lid 96 is magnetically attachable to the top edges of the first wall 86, second wall 90, and divider wall 94. While three sections 98A-98C are shown, this disclosure extends to lids with a different number of sections. Further, while the lid 96 is disclosed as being magnetic, the lid 96 could be attachable to cover the top of the first section 82 in another manner that does not include the use of magnets. Further, the lid 96 could at least partially cover the second section 84 in some examples.

The first section 82 receives thermally conditioned air from the front trunk loop 54, in this example. Accordingly, the first section 82 is particularly suited for storage of items 100 that would benefit from thermal conditioning, such as food or beverages, whereas the second section 84 is suited for storage of other items 102, such as shoes or clothes.

In this example, the side wall 36 includes a vent 104 configured to expel thermally conditioned air from the front trunk loop 54 into the first section 82. The first wall 86, second wall 90, divider wall 94, and lid 96 thermally insulate the first section 82 from the areas outside the first section 82. The first section 82 may include a return configured to direct air back to the front trunk loop 54. In this embodiment, all fluid in the front trunk loop 54 flows through the first section 84. The vent 104 is part of the front trunk loop 54. In this example, the vent 104 includes opposed tabs 106 configured to fit in the slots 88A, 92A closest to the side wall 36.

Figure 8:
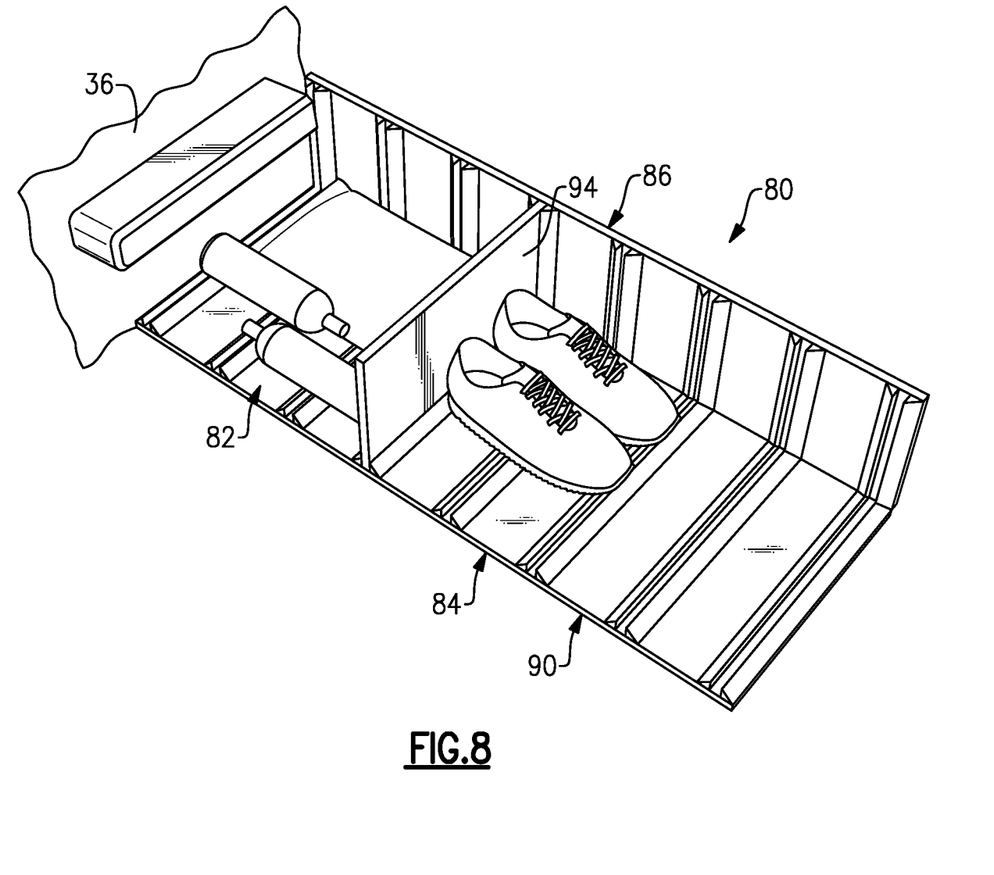
FIG. 8 illustrates additional detail of another divider assembly relative to a portion of the front trunk.
Figure 9:
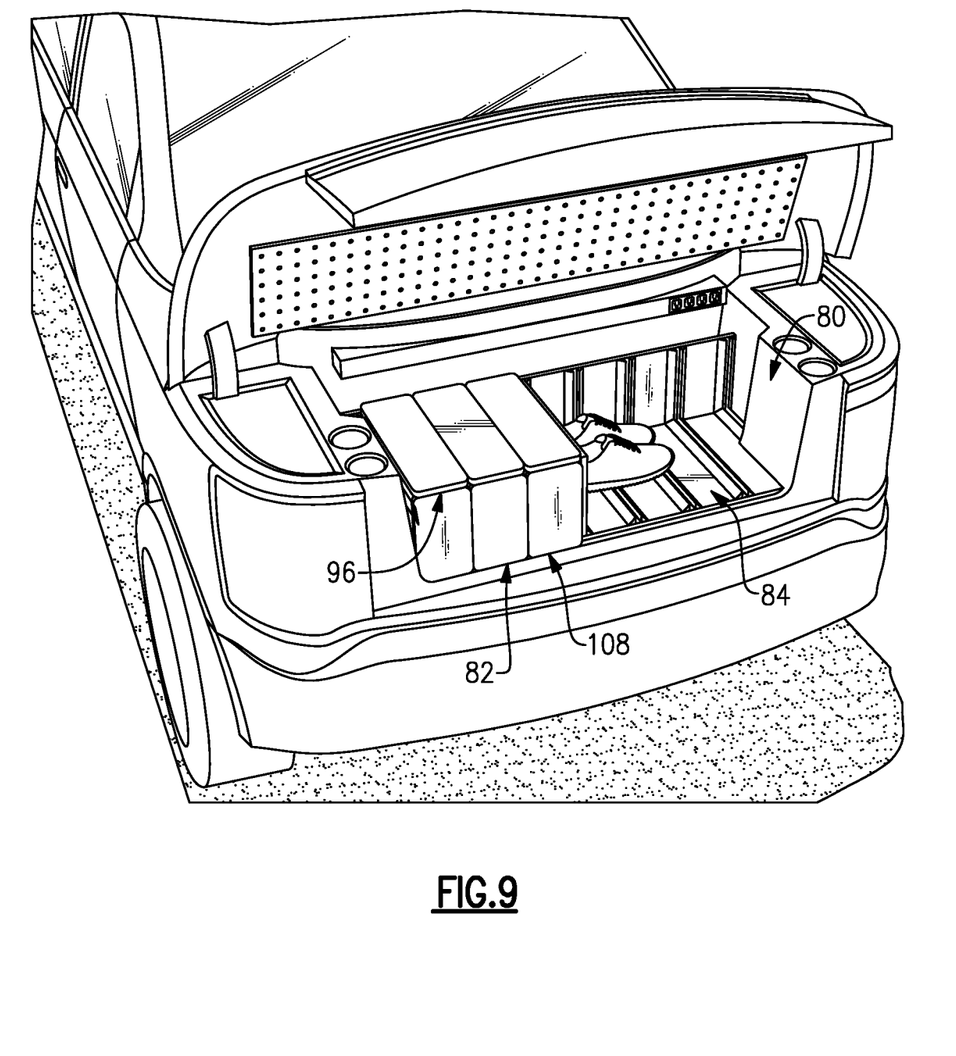
FIG. 9 illustrates the divider assembly of FIG. 8 relative to the front trunk, with a lid covering a section of the divider assembly.

In FIGS. 5 and 6, the second wall 90 is adjacent a front of the front trunk 26. As such, the first and second sections 82, 84 are accessible by a user from a top, reaching over the top of the second wall 90. FIGS. 8 and 9 illustrate another arrangement of the divider assembly 80 in which the second wall 90 is arranged adjacent the floor 32. In this example, the second wall 90 does not provide a boundary to either the first or second sections 82, 84 from the front. As such, another lid 108 configured substantially similarly to the lid 96 is used to cover the first section 82 from the front, as shown in FIG. 9. The lid 108 is foldable, similar to lid 96, to vary its effective surface area, and may be magnetically attachable to edges of the divider wall 94, vent 104, second wall 90, and lid 96 to cover the first section 82 from the front. The lids 96, 108 could be formed separately or as one integrated lid configured to cover the first section 82 from both the top and front. The second section 84 is not covered from the front, in this example, such that a user can load and unload that section without needing to reach over a wall.

It should be understood that terms such as "about," "substantially," and "generally" are not intended to be boundaryless terms, and should be interpreted consistent with the way one skilled in the art would interpret those terms. Further, directional terms such as "forward," "rearward," "upward," "downward," "vertical," "horizontal," etc., are used with reference to the normal operational orientation of the vehicle and are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
a climate control system;
a front trunk establishing a cargo space, wherein the front trunk is configured to receive thermally conditioned air from the climate control system;
a closure assembly configured to move to selectively cover and uncover the front trunk; and
an insulated container arranged in the cargo space, wherein the front trunk and the insulated container are configured such that thermally conditioned air from the climate control system is directed into an interior of the insulated container, and wherein the insulated container is configured such that the insulated container remains within the cargo space during movement of the closure assembly,
wherein the insulated container includes an inlet configured to fluidly connect to an outlet of the front trunk, wherein the thermally conditioned air from the climate control system is expelled from the outlet and is directed into the interior of the insulated container via the inlet, and
wherein the inlet is a female fitting and the outlet is a male fitting.

2. The motor vehicle as recited in claim 1, wherein the insulated container is a soft-sided cooler.

3. The motor vehicle as recited in claim 2, wherein the soft-sided cooler exhibits a length substantially equal to a length of the cargo space.

4. The motor vehicle as recited in claim 2, wherein:
when the soft-sided cooler is in an expanded condition, the soft-sided cooler exhibits a first height, and
when the soft-sided cooler is in a reduced-height condition, the soft-sided cooler exhibits a second height less than the first height.

5. The motor vehicle as recited in claim 4, wherein the soft-sided cooler is configured to open and close via a zipper.

6. The motor vehicle as recited in claim 1, wherein the closure assembly includes a hood and grille of the motor vehicle.

7. The motor vehicle as recited in claim 1, wherein the front trunk includes a floor, wherein the insulated container is supported by the floor, and wherein the insulated container is configured so as to remain in place relative to the floor during movement of the closure assembly.

8. A method, comprising:
directing thermally conditioned air from a climate control system of a motor vehicle into a cargo space established by a front trunk of the motor vehicle; and
configuring a divider assembly to divide the cargo space into a first section that is configured to directly receive thermally conditioned air from the climate control system and a second section that does not directly receive thermally conditioned air from the climate control system, wherein the configuring step includes arranging a divider wall within the cargo space such that the first section is separated from the second section by the divider wall, and such that the first section is spaced-apart from the second section, by the divider wall, in a direction perpendicular to a centerline of the motor vehicle,
wherein after the configuring step the first section exhibits a first size and the second section exhibits a second size,
wherein the method further comprises reconfiguring the divider assembly such that the divider wall is moved relative to a position of the divider wall immediately following the configuring step, and
wherein, after reconfiguring the divider assembly, the first section exhibits a third size different than the first size and the second section exhibits a fourth size different than the second size.

9. The method as recited in claim 8, wherein:
the step of configuring the divider assembly includes arranging the divider wall into one of a plurality of slots in a first wall and one of a plurality of slots in a second wall, and
the first wall is adjacent a rear of the front trunk, and the second wall is either adjacent bottom of the front trunk or adjacent a front of the front trunk.

10. The method as recited in claim 8, wherein the directing step includes expelling thermally conditioned air into the cargo space via a vent or expelling thermally conditioned air into a soft-sided cooler arranged in the cargo space.

11. The method as recited in claim 8, further comprising:
after the configuring step, folding a lid such that the lid exhibits a first surface area configured to cover the first section; and
after the reconfiguring step, folding the lid such that the lid exhibits a second surface area configured to cover the first section, wherein the second surface area is different than the first surface area.

* * * * *